(12) United States Patent
Li et al.

(10) Patent No.: US 9,667,554 B2
(45) Date of Patent: May 30, 2017

(54) DS DOMAIN GENERATING METHOD, DEVICE AND SYSTEM

(71) Applicant: Huawei Technologies Co., Ltd., Shenzhen (CN)

(72) Inventors: Xianming Li, Nanjing (CN); Ying Xie, Nanjing (CN); Shuming Liu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 195 days.

(21) Appl. No.: 14/569,138

(22) Filed: Dec. 12, 2014

(65) Prior Publication Data
US 2015/0188827 A1 Jul. 2, 2015

(30) Foreign Application Priority Data
Dec. 27, 2013 (CN) .......................... 2013 1 0740356

(51) Int. Cl.
*H04L 12/28* (2006.01)
*H04L 12/851* (2013.01)
*H04L 12/24* (2006.01)

(52) U.S. Cl.
CPC ........ *H04L 47/2408* (2013.01); *H04L 41/085* (2013.01); *H04L 41/0806* (2013.01); *H04L 41/0813* (2013.01); *H04L 41/0893* (2013.01); *H04L 41/084* (2013.01); *Y02B 60/43* (2013.01)

(58) Field of Classification Search
CPC .................................................. H04L 47/2408
USPC ....................................................... 370/254
See application file for complete search history.

(56) References Cited

U.S. PATENT DOCUMENTS

| 6,463,470 B1 | 10/2002 | Mohaban et al. |
| 6,839,327 B1 | 1/2005 | Zavalkovsky et al. |
| 2005/0198224 A1* | 9/2005 | Kobayashi ............ H04L 67/322 709/220 |

(Continued)

FOREIGN PATENT DOCUMENTS

EP          1548979 A1    6/2005

OTHER PUBLICATIONS

Damianou, N., et al., "A Policy Framework for Management of Distributed Systems," Imperial College of Science, Technology and Medicine, Feb. 2002, 118 pages.

(Continued)

*Primary Examiner* — Christopher R Crompton
(74) *Attorney, Agent, or Firm* — Conley Rose, P.C.

(57) ABSTRACT

A differentiated service (DS) domain generating method, a device, and a system. A network management device obtains device attribute information of multiple DS devices; determines according to the device attribute information of the multiple DS devices, a DS device that belongs to a first DS domain; and sends a notification message to the DS device that belongs to the first DS domain, so that the DS device that belongs to the first DS domain joins the first DS domain according to the notification message, thereby implementing automatic determining and generation of a DS domain, reducing workload of configuring quality of service (QoS) parameters in a DS domain including a relatively large number of devices, and improving efficiency in generating and maintaining the DS domain.

20 Claims, 5 Drawing Sheets

(56) References Cited

U.S. PATENT DOCUMENTS

2005/0262299 A1* 11/2005 Mimatsu ............... G06F 3/0605
 711/114
2013/0246593 A1 9/2013 Bryskin et al.

OTHER PUBLICATIONS

Foreign Communication From a Counterpart Application, European Application No. 14197091.3, Extended European Search Report dated May 4, 2015, 10 pages.

* cited by examiner

DS DOMAIN GENERATING METHOD, DEVICE AND SYSTEM

CROSS-REFERENCE TO RELATED APPLICATION

This application claims priority to Chinese Patent Application No. 201310740356.4, filed on Dec. 27, 2013, which is hereby incorporated by reference in its entirety.

TECHNICAL FIELD

The present invention relates to communications technologies, and in particular, to a differentiated service (DS) domain generating method, a device, and a system.

BACKGROUND

With development of network technologies, streaming media applications have become more important. A "best-effort" transmission manner in a conventional network is increasingly unable to satisfy requirements of current applications. Therefore, the Internet Engineering Task Group (IETF) defines two structures: an integrated service (IntSrev) and a DS. Due to complexity and an extensibility problem of the integrated service, the DS appears more attractive in the aspect of ensuring transmission quality of service (QoS) in large-sized networks.

In a DS network, a concept of domain is introduced. A DS domain includes neighboring DS nodes that support a same QoS policy. In the prior art, a process of generating a DS domain is that a user determines a DS domain according to a DS rule applied to each DS node and a DS domain identifier (ID) configured for each DS node. A specific manner is, if all DS nodes have a same applied DS rule and a same DS domain ID, the user manually defines a DS node meeting a condition to constitute a DS domain, and uses the DS domain ID, which is configured for the DS node in the same DS domain, to identify the DS domain.

However, when a size of a network is relatively large, the method for generating a DS domain by means of manual configuration is both error-prone and inefficient.

SUMMARY

The present invention provides a DS domain generating method, a device and a system, which implements automatic determining and generation of a DS domain, reduces workload of configuring QoS parameters in a DS domain including a relatively large number of devices, and improves efficiency in generating and maintaining the DS domain.

According to a first aspect, the present invention provides a DS domain generating method, including obtaining device attribute information of multiple DS devices; determining, according to the device attribute information of the multiple DS devices, a DS device that belongs to a first DS domain; and sending a notification message to the DS device that belongs to the first DS domain, so that the DS device that belongs to the first DS domain joins the first DS domain according to the notification message.

According to a second aspect, the present invention provides a DS domain generating method, including sending device attribute information to a network management system (NMS), so that the NMS determines, according to device attribute information of multiple DS devices, a DS device that belongs to a first DS domain; receiving a notification message sent by the NMS; and joining the first DS domain according to the notification message.

According to a third aspect, the present invention provides a network management device, including an obtaining module configured to obtain device attribute information of multiple DS devices; a determining module configured to determine, according to the device attribute information of the multiple DS devices, a DS device that belongs to a first DS domain; and a first sending module configured to send a notification message to the DS device that belongs to the first DS domain, so that the DS device that belongs to the first DS domain joins the first DS domain according to the notification message.

According to a fourth aspect, the present invention provides a DS device, including a first sending module configured to send device attribute information to an NMS, so that the NMS determines, according to device attribute information of multiple DS devices, a DS device that belongs to a first DS domain; a first receiving module configured to receive a notification message sent by the NMS; and a processing module configured to join the first DS domain according to the notification message.

According to a fifth aspect, the present invention provides a DS domain system, including the network management device according to any possible implementation manner of the third aspect, and the DS device according to any possible implementation manner of the fourth aspect.

In the DS domain generating method, the device and the system provided in embodiments of the present invention, by obtaining device attribute information of multiple DS devices, a DS device that belongs to a first DS domain is determined according to the device attribute information of the multiple DS devices; and a notification message is sent to the DS device that belongs to the first DS domain, so that the DS device that belongs to the first DS domain joins the first DS domain according to the notification message, thereby implementing automatic determining and generation of a DS domain, reducing workload of configuring QoS parameters in a DS domain including a relatively large number of devices, and improving efficiency in generating and maintaining the DS domain.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
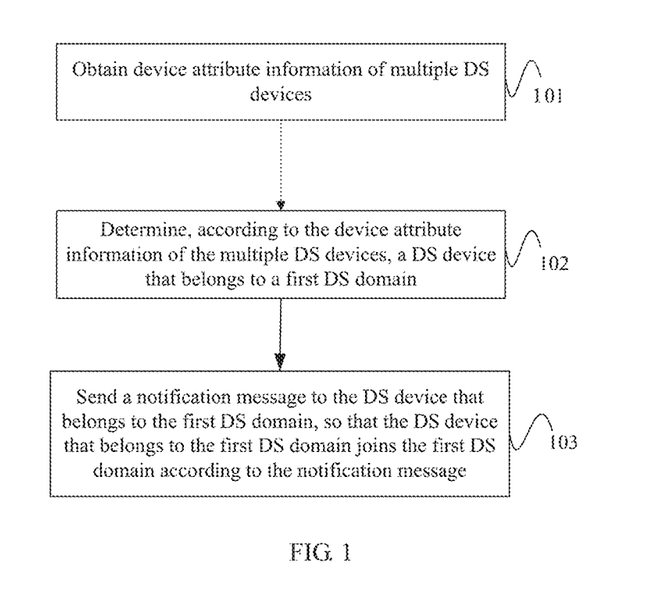
FIG. 1 is a schematic flowchart of a DS domain generating method according to the present invention.
Figure 2:
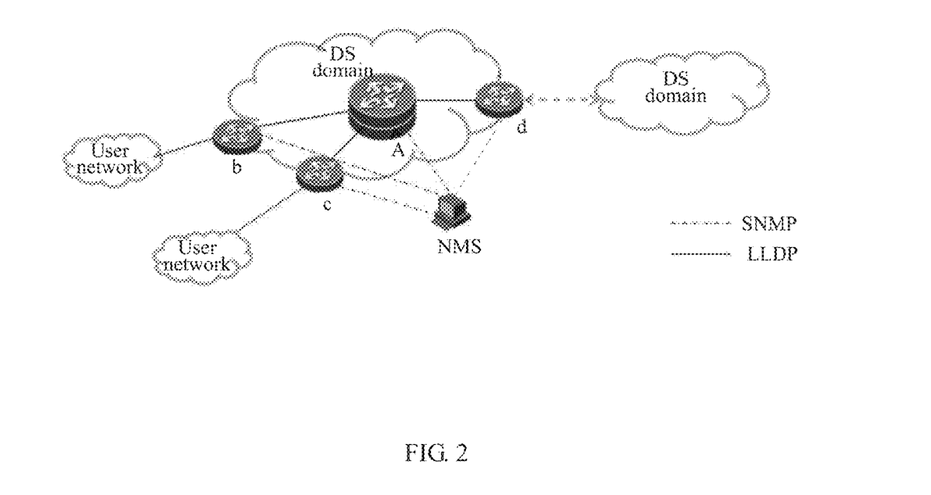
FIG. 2 is a schematic diagram of a connection relationship between devices according to the present invention.

FIG. 1 is a schematic flowchart of a DS domain generating method according to the present invention, and FIG. 2 is a schematic diagram of a connection relationship between devices according to the present invention. An entity for implementing this embodiment is a network management device configured in an NMS, where the device may be implemented using hardware, software, or the combination thereof. The solution of this embodiment is applied between a DS device and the NMS, and uses the NMS to determine DS devices that belong to a same DS domain. As shown in FIG. 1, the method according to this embodiment includes the following steps:

Step 101: Obtain device attribute information of multiple DS devices.

In this embodiment, as shown in FIG. 2, the NMS may obtain device attribute information stored on multiple DS devices, such as a DS device b, a DS device c, a DS device d, and a DS device A. The device attribute information stored on a DS device may be device attribute information of the DS device itself, or may be device attribute information of another DS device. When the NMS has obtained the device attribute information of the other DS device from one DS device, the NMS does not need to separately obtain the device attribute information of the another DS device, thereby saving time of obtaining the device attribute information. In this embodiment, the device attribute information may include at least one of: a DS domain identifier, a device identifier, a DS rule applied to a device, a device type, and a device software version, where the device identifier may be a device name or a device IP address, and the NMS identifies each DS device according to the device identifier. The NMS may further obtain topology information of interconnections between the multiple DS devices. According to the topology information, the NMS can better maintain a generated DS domain network.

Step 102: According to the device attribute information of the multiple DS devices, determine a DS device that belongs to a first DS domain.

In this embodiment, when the NMS obtains the device attribute information of the multiple DS devices in step 101, because according to network planning and a QoS requirement, a user configures a DS domain identifier on each DS device or each port but configures no specific QoS rule, therefore, the device attribute information of the multiple DS devices, which is obtained by the NMS, includes DS domain identifiers of the multiple DS devices; and the NMS determines, according to the DS domain identifiers of the multiple DS devices, the DS device that belongs to the first DS domain. When the DS domain identifiers configured for the multiple DS devices or ports are the same, or when DS domain identifiers of some of the DS devices are the same, it is determined that the DS devices with the same DS domain identifier belong to the first DS domain. In this embodiment, when the device attribute information of the multiple DS devices is obtained in step 101, if device attribute information of another DS device is stored on one of the DS devices, the device attribute information of the another DS device may be obtained from the one DS device. Therefore, in this embodiment, a DS device that belongs to the first DS domain may be determined according to a DS domain identifier of the other DS device stored on the one DS device. For example, as shown in FIG. 2, the NMS obtains a DS domain identifier of the DS device b from the DS device b. Because the DS device b also stores DS domain identifiers of the DS device c, the DS device d, and the DS device A, the DS domain identifiers of the DS device c, the DS device d, and the DS device A may also be obtained from the DS device b. If the DS domain identifier of the DS device b is the same as those of the DS device c and the DS device d but different from the DS domain identifier of the DS device A, the NMS may, according to the DS domain identifier included in the DS device b, determine that the DS device b, the DS device c, and the DS device d belong to the first DS domain, but the DS device A does not belong to the first DS domain. The first DS domain is for ease of description only, and is used to represent a certain DS domain rather than restrict a domain name or a domain identifier of a DS domain.

Step 103: Send a notification message to the DS device that belongs to the first DS domain, so that the DS device that belongs to the first DS domain joins the first DS domain according to the notification message.

In this embodiment, after the DS devices that belong to the first DS domain are determined, the NMS sends, according to device identifiers, a notification message to each DS device that belongs to the first DS domain, where the notification message is a message that includes the DS domain identifier of the first DS domain, and the DS device that receives the notification message automatically joins the first DS domain.

In this embodiment, by obtaining device attribute information of multiple DS devices, a DS device that belongs to a first DS domain is determined according to the device attribute information of the multiple DS devices, and a notification message is sent to the DS device that belongs to the first DS domain, so that the DS device that belongs to the first DS domain joins the first DS domain according to the notification message, thereby implementing automatic determining and generation of a DS domain, reducing workload of obtaining DS device attribute information from a DS domain including a relatively large number of DS devices, and improving efficiency in generating the DS domain.

Figure 3:
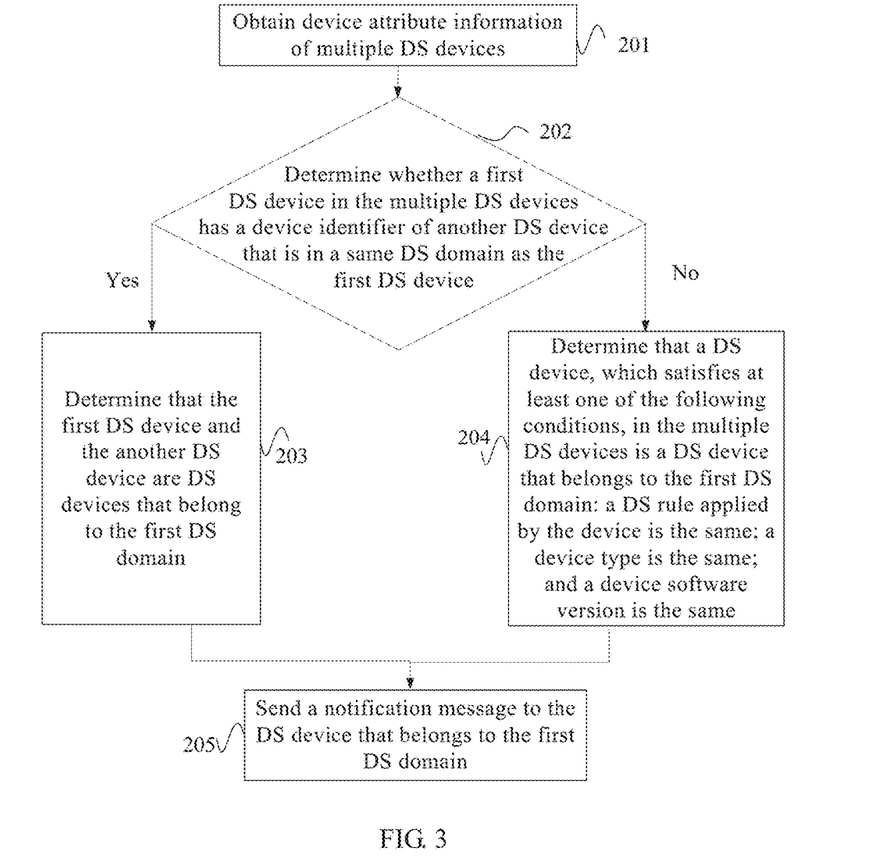
FIG. 3 is a schematic flowchart of another DS domain generating method according to the present invention.

FIG. 3 is a schematic flowchart of another DS domain generating method according to the present invention. Further, on the basis of the embodiment shown in FIG. 1, as shown in FIG. 3, the method in this embodiment includes the following steps:

Step 201: Obtain device attribute information of multiple DS devices.

In this embodiment, the NMS obtains the device attribute information of the multiple DS devices according to a Simple Network Management Protocol (SNMP). A link represented by a dotted line shown in FIG. 2 is a link using which the NMS uses the SNMP protocol to obtain the device attribute information, where the device attribute information of the multiple DS devices is stored in a management information base (MIB) of a DS device. The MIB of the DS device includes the MIB of the DS device itself (local MIB) and a remote MIB, where the local MIB includes various types of information of the DS device itself, and the remote MIB stores device attribute information of another DS device, topology information of the connected multiple DS devices, and the like. Therefore, the NMS can obtain the device attribute information of another DS device from one DS device. The device attribute information may be at least one of: a DS domain identifier, a device identifier, a DS rule applied to a device, a device type, and a device software version.

Step 202: According to the device attribute information of the multiple DS devices, determine whether a first DS device in the multiple DS devices has a device identifier of another DS device that is in a same DS domain as the first DS device; if yes, perform step 203; if no, perform step 204.

In this embodiment, according to network planning and a QoS requirement, a user configures a DS domain identifier for some DS devices but does not configure a DS domain identifier for some DS devices, or does not configure a DS domain identifier for any of the multiple DS devices. In this case, provided that the obtained device attribute information includes a DS domain identifier, DS devices that belong to a same DS domain are determined preferentially according to the DS domain identifier. In a case in which no DS domain identifier is configured for a DS device, which results in that the obtained device attribute information does not include a DS domain identifier, the NMS determines a DS device belonging to a same DS domain according to whether a first DS device in the multiple DS devices has a device identifier of another DS device that is in a same DS domain as the first DS device. In this embodiment, the first DS device may be any DS device in the DS devices.

Step 203: Determine that the first DS device and the other DS device are DS devices that belong to a first DS domain.

In this embodiment, during the network planning, the user configures, for the first DS device, the device identifier of the another DS device that belongs to the same DS domain; and therefore, when obtaining the device attribute information, the NMS obtains this configuration information for the first DS device and then determines that the first DS device and the another DS device are DS devices that belong to the first DS domain.

Step 204: Determine that a DS device, which satisfies at least one of the following conditions in the multiple DS devices, is a DS device that belongs to the first DS domain. A DS rule applied to the device is the same as that of the first DS device; a device type is the same as that of the first DS device; and a device software version is the same as that of the first DS device.

In this embodiment, when the device identifier of the another DS device that belongs to the same DS domain is not configured for the first DS device, the NMS determines, according to an obtained DS rule applied to the device, device type, and software version, a DS device that belongs to the first DS domain. In this embodiment, the NMS may determine that DS devices that apply a same DS rule among the multiple DS devices are DS devices that belong to the first DS domain; or may determine that DS devices with a same device type, device software version, or the combination thereof as that of the first DS device, among the multiple DS devices are DS devices that belong to the first DS domain. In this embodiment, if the obtained device attribute information includes all of a DS rule applied to a device, a device type, and a software version, a DS device that belongs to the first DS domain is determined preferentially according to the DS rule applied to the device.

Step 205: Send a notification message to the DS device that belongs to the first DS domain, so that the DS device that belongs to the first DS domain joins the first DS domain according to the notification message.

In this embodiment, after the NMS determines the DS device that belongs to the first DS domain, the NMS uses an SNMP protocol to send a notification message to the DS device that belongs to the first DS domain, where the notification message is a message that includes a DS domain identifier of a DS domain to which the DS device belongs (that is, the first DS domain), and the DS device that receives the notification message automatically joins the first DS domain.

In this embodiment, by obtaining device attribute information of multiple DS devices, a DS device that belongs to a first DS domain is determined according to the device attribute information of the multiple DS devices, and a notification message is sent to the DS device that belongs to the first DS domain, so that the DS device that belongs to the first DS domain joins the first DS domain according to the notification message, thereby implementing automatic determining and generation of a DS domain, reducing workload of obtaining DS device attribute information from a DS domain including a relatively large number of DS devices, and improving efficiency in generating the DS domain.

Further, on the basis of the foregoing embodiment, in this embodiment, after the notification message is sent to the DS device that belongs to the first DS domain, if the DS domain needs to be updated, that is, if a new QoS policy needs to be added into the DS domain or an existing QoS policy needs to be modified, the NMS sends an update message to a DS device in the DS domain that needs to be updated, so that the DS device performs DS domain update according to the update message. The update message may be DS rule information or QoS policy information, and the update message may further include information about a DS domain identifier of the DS domain that needs to be updated. In this way, when receiving the update message, the DS device may determine, according to its own DS domain identifier information and a DS domain identifier in the update message, whether to perform update.

Alternatively, when the DS domain needs to be updated, the NMS sends an update message to a second DS device in the DS domain that needs to be updated. When receiving the update message, the second DS device update the configuration of the second DS device according to the update message on the one hand, and, on the other hand, sends the update message to another DS device that belongs to a same DS domain, so that the another DS device updates the configuration of the another DS device according to the update message. In this embodiment, the second DS device may be one DS device in the DS domain, and the second DS device and the first DS device may be the same DS device.

In this embodiment, by sending an update message to a DS device, the DS device automatically performs maintenance according to the update message, thereby reducing workload of configuring QoS policy parameters and DS rules for a DS domain including a relatively large number of devices, and improving efficiency in maintaining the DS domain.

Figure 4:
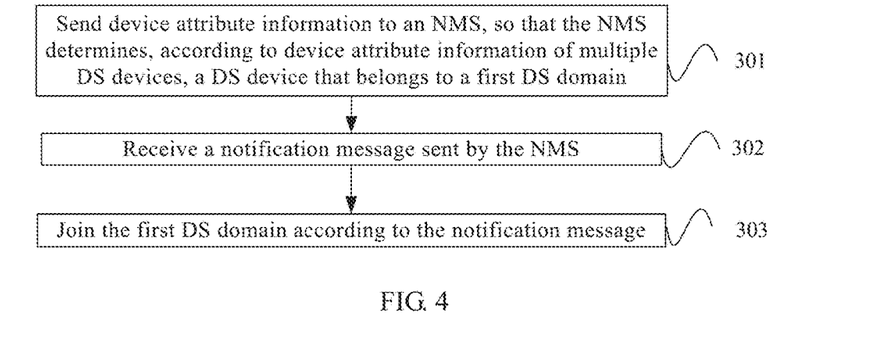
FIG. 4 is a schematic flowchart of another DS domain generating method according to the present invention.

FIG. 4 is a schematic flowchart of another DS domain generating method according to the present invention. An entity for implementing this embodiment is a DS device, and the device may be implemented using hardware, software or the combination thereof. The solution of this embodiment is applied between the DS device and an NMS. As shown in FIG. 4, the method according to this embodiment includes the following steps:

Step 301: Send device attribute information to the NMS, so that the NMS determines, according to device attribute information of multiple DS devices, a DS device that belongs to a first DS domain.

In this embodiment, before sending the device attribute information to the NMS, the multiple DS devices receive an extended Link Layer Discovery Protocol (LLDP) message sent by another DS device, where the extended LLDP message includes device attribute information of the another DS device, and the device attribute information may be at least one of: a DS domain identifier, a device identifier, a DS rule applied to a device, a device type, and a device software version. The device attribute information of the another DS device in the extended LLDP message is stored in a MIB. In this embodiment, a prior-art LLDP message cannot contain a DS domain identifier and/or information about a DS rule applied to a device; but in this embodiment, a type length value (TLV) in the LLDP is extended, and a TLV in an extension part may be used to denote an identifier of the first DS domain, the DS rule applied to a device, or the combination thereof. Therefore, the extended LLDP message can contain the DS domain identifier, the information about the DS rule applied to the device, or the combination thereof.

In this embodiment, the DS device may store the device attribute information of the other DS device in the extended LLDP message in a remote MIB. Therefore, the DS device may obtain the device attribute information of the other DS device from the remote MIB and sends to the NMS. The device attribute information of the multiple DS devices may be sent to the NMS by each of the multiple DS devices respectively, or may be sent by one of the multiple DS devices.

Step 302: Receive a notification message sent by the NMS.

In this embodiment, after the DS device sends the device attribute information, the NMS determines, according to the received device attribute information, the DS device that belongs to the first DS domain, and then sends a notification message to the DS device that belongs to the first DS domain. The DS device receives the notification message sent by the NMS, where the notification message includes a hash result of a DS domain identifier of a DS domain to which the DS device belongs (that is, the first DS domain) or a DS rule, and the notification message is used by the DS device that belongs to the first DS domain to learn about a DS rule that needs to be applied.

Step 303: Join the first DS domain according to the notification message.

In this embodiment, a DS device that receives the notification message applies a specific DS rule to join the first DS domain according to the notification message.

In this embodiment, device attribute information is sent to an NMS, so that the NMS determines, according to device attribute information of multiple DS devices, a DS device that belongs to a first DS domain; and then the DS device receives a notification message sent by the NMS, and joins the first DS domain according to the notification message, thereby implementing automatic determining and generation of a DS domain and improving efficiency in generating the DS domain.

Further, on the basis of the embodiment shown in FIG. 4, in this embodiment, after step 303, the following is further included. If the first DS domain needs to be updated, for example, if a new QoS policy needs to be added into the DS domain or an existing QoS policy needs to be modified, a DS device in the DS domain that needs to be updated receives an update message sent by the NMS, where the update message may include a DS rule or a QoS policy, and the update message may further include information about a DS domain identifier of the DS domain that needs to be updated. In this way, when receiving the update message, the DS device can determine, according to its own DS domain identifier and the DS domain identifier in the update message, whether to perform update.

When the DS domain needs to be updated, the DS device in the DS domain that needs to be updated receives the update message sent by the NMS, and performs DS domain update according to the update message. Alternatively, the DS device in the DS domain that needs to be updated receives an update message sent by a DS device (which may be a second DS device) that belongs to the first DS domain; and in this case, the NMS sends an update message to the DS device in the first DS domain, and the DS device forwards the update message to another DS device in the first DS domain, so that the another DS device that belongs to the first DS domain performs DS domain update according to the update message.

In this embodiment, by receiving an update message sent by the NMS, a DS device performs maintenance automatically according to the update message, thereby reducing workload of configuring QoS policy parameters and DS rules in a DS domain including a relatively large number of devices, and improving efficiency in maintaining the DS domain.

Figure 5:
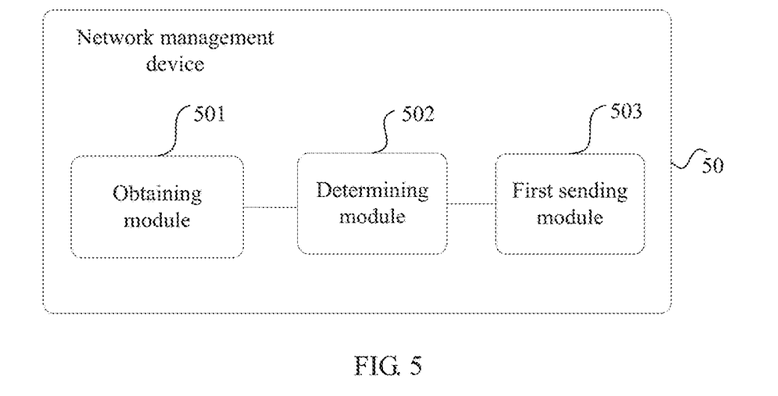
FIG. 5 is a schematic structural diagram of a network management device according to the present invention.

FIG. 5 is a schematic structural diagram of a network management device according to the present invention. As shown in FIG. 5, a network management device 50 according to this embodiment includes an obtaining module 501, a determining module 502, and a first sending module 503.

The obtaining module 501 is configured to obtain device attribute information of multiple DS devices.

The determining module 502 is configured to determine, according to the device attribute information of the multiple DS devices, a DS device that belongs to a first DS domain.

The first sending module 503 is configured to send a notification message to the DS device that belongs to the first DS domain, so that the DS device that belongs to the first DS domain joins the first DS domain according to the notification message.

The device in the foregoing embodiment is used to implement the technical solutions of the method embodiment shown in FIG. 1, and the implementation principles and technical effects of the device are similar to those of the method, and are not described herein again.

In this embodiment, an obtaining module obtains device attribute information of multiple DS devices; a determining module determines, according to the device attribute information of the multiple DS devices, a DS device that belongs to a first DS domain; and a first sending module sends a notification message to the DS device that belongs to the first DS domain, so that the DS device that belongs to the first DS domain joins the first DS domain according to the notification message, thereby implementing automatic determining and generation of a DS domain, reducing workload of obtaining DS device attribute information from a DS domain including a relatively large number of DS devices, and improving efficiency in generating the DS domain.

Further, on the basis of this embodiment, the device attribute information obtained by the obtaining module 501 includes at least one of the following types of information:

a DS domain identifier, a device identifier, a DS rule applied to a device, a device type, and a device software version.

Further, on the basis of the embodiment shown in FIG. 5, the determining module 502 is configured to determine that DS devices with a same DS domain identifier in the multiple DS devices are DS devices that belong to the first DS domain.

Further, on the basis of this embodiment, the determining module 502 is configured to determine whether a first DS device in the multiple DS devices has a device identifier of another DS device that is in a same DS domain as the first DS device; if the first DS device has the device identifier of the another DS device that is in the same DS domain as the first DS device, determine that the first DS device and the another DS device are DS devices that belong to the first DS domain; or if the first DS device does not have the device identifier of the another DS device that is in the same DS domain as the first DS device, determine that a DS device, which satisfies at least one of the following conditions, in the multiple DS devices is a DS device that belongs to the first DS domain. A DS rule applied to the device is the same as that of the first DS device; a device type is the same as that of the first DS device; and a device software version is the same as that of the first DS device.

Further, on the basis of this embodiment, the obtaining module 501 is configured to obtain the device attribute information from MIBs of the multiple DS devices using a SNMP, or obtain the device attribute information of the multiple DS devices from a MIB of one DS device using a SNMP.

The device in the foregoing embodiment is used to implement the technical solutions of the method embodiment shown in FIG. 3, and the implementation principles and technical effects of the device are similar to those of the method, and are not described herein again.

Further, on the basis of this embodiment, the network management device 50 further includes a second sending module configured to after the first sending module sends the notification message to the DS device that belongs to the first DS domain, if the first DS domain needs to be updated, send an update message to the DS device that belongs to the first DS domain, so that the DS device that belongs to the first DS domain performs DS domain update according to the update message; or if the first DS domain needs to be updated, send an update message to a second DS device that belongs to the first DS domain, so that the second DS device sends the update message to another DS device that belongs to the first DS domain, and then, the DS device that belongs to the first DS domain performs DS domain update according to the update message.

The update message includes at least one of the following types of information:

DS rule information and a QoS policy.

The device in the foregoing embodiment is used to implement the technical solutions of the method embodiments shown in FIG. 1 and FIG. 3, and the implementation principles and technical effects of the device are similar to those of the method, and are not described herein again.

Figure 6:
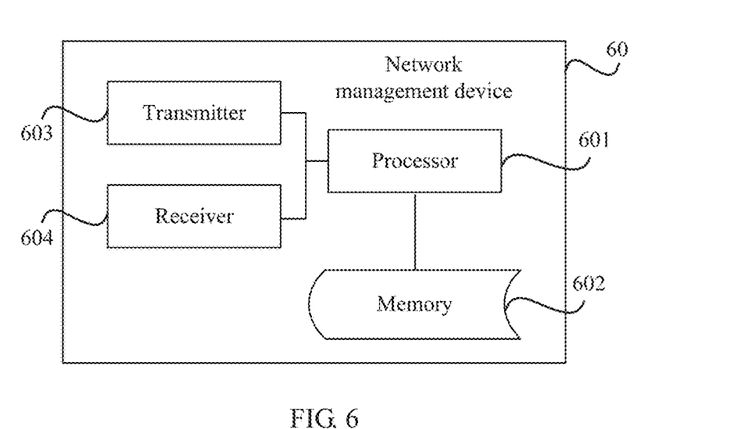
FIG. 6 is a schematic structural diagram of another network management device according to the present invention.

FIG. 6 is a schematic structural diagram of another network management device according to the present invention. As shown in FIG. 6, a network management device 60 according to this embodiment includes a processor 601 and a memory 602, and the network management device 60 may further include a transmitter 603 and a receiver 604. The transmitter 603 and the receiver 604 may be connected to the processor 601. The transmitter 603 is configured to send data or a message; the receiver 604 is configured to receive the data or the message; the memory 602 stores a program instruction; when the network management device 60 runs, the processor 601 and the memory 602 communicate with each other, and the processor 601 invokes the program instruction in the memory 602 to perform the following operations: obtaining device attribute information of multiple DS devices; determining, according to the device attribute information of the multiple DS devices, a DS device that belongs to a first DS domain; and sending a notification message to the DS device that belongs to the first DS domain, so that the DS device that belongs to the first DS domain joins the first DS domain according to the notification message.

Optionally, the device attribute information includes at least one of the following types of information: a DS domain identifier, a device identifier, a DS rule applied to a device, a device type, and a device software version.

Optionally, the determining, according to the device attribute information of the multiple DS devices, a DS device that belongs to a first DS domain includes determining that DS devices with a same DS domain identifier in the multiple DS devices are DS devices that belong to the first DS domain.

Optionally, the determining, according to the device attribute information of the multiple DS devices, a DS device that belongs to a first DS domain includes determining whether a first DS device in the multiple DS devices has a device identifier of another DS device that is in a same DS domain as the first DS device; if the first DS device has the device identifier of the another DS device that is in the same DS domain as the first DS device, determining that the first DS device and the another DS device are DS devices that belong to the first DS domain; or if the first DS device does not have the device identifier of the another DS device that is in the same DS domain as the first DS device, determining that a DS device, which satisfies at least one of the following conditions, in the multiple DS devices is a DS device that belongs to the first DS domain. A DS rule applied to the device is the same as that of the first DS device; a device type is the same as that of the first DS device; and a device software version is the same as that of the first DS device.

Optionally, the obtaining device attribute information of multiple DS devices includes obtaining the device attribute information from MIB s of the multiple DS devices using a SNMP, or obtaining the device attribute information of the multiple DS devices from a MIB of one DS device using a SNMP.

Optionally, after the sending a notification message to the DS device that belongs to the first DS domain, the following is further included. If the first DS domain needs to be updated, sending an update message to the DS device that belongs to the first DS domain, so that the DS device that belongs to the first DS domain performs DS domain update according to the update message; or if the first DS domain needs to be updated, send an update message to a second DS device that belongs to the first DS domain, so that the second DS device sends the update message to another DS device that belongs to the first DS domain.

Optionally, the update message includes at least one of the following types of information:

DS rule information and a QoS policy.

The network management device in this embodiment may be used to implement the technical solutions provided in the method embodiments shown in FIG. 1 and FIG. 3 in the present invention, and the implementation principles and technical effects of the device are similar to those of the methods, and are not described herein again.

Figure 7A:
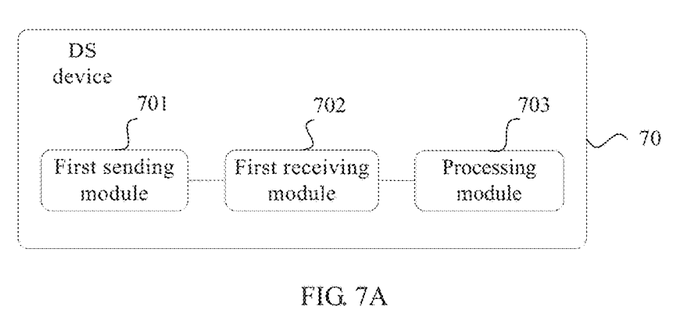
FIG. 7A is a schematic structural diagram of a DS device according to the present invention.

FIG. 7A is a schematic structural diagram of a DS device according to the present invention. As shown in FIG. 7A, a DS device 70 according to this embodiment includes a first sending module 701, a first receiving module 702, and a processing module 703.

The first sending module 701 is configured to send device attribute information to an NMS, so that the NMS determines, according to device attribute information of multiple DS devices, a DS device that belongs to a first DS domain.

The first receiving module 702 is configured to receive a notification message sent by the NMS.

The processing module 703 is configured to join the first DS domain according to the notification message.

The device in the foregoing embodiment is used to implement the technical solutions of the method embodiment shown in FIG. 4, and the implementation principles and technical effects of the device are similar to those of the method, and are not described herein again.

In this embodiment, a first sending module 701 sends device attribute information to an NMS, so that the NMS determines, according to device attribute information of multiple DS devices, a DS device that belongs to a first DS domain; and then a first receiving module 702 receives a notification message sent by the NMS; and a processing module 703 joins the first DS domain according to the notification message, thereby implementing automatic determining and generation of a DS domain, reducing workload of sending DS device attribute information in a DS domain including a relatively large number of DS devices, and improving efficiency in generating the DS domain.

Further, on the basis of the embodiment in FIG. 7A, the device attribute information sent by the first sending module 701 includes at least one of the following types of information: a DS domain identifier, a device identifier, a DS rule applied to a device, a device type, and a device software version.

Figure 7B:
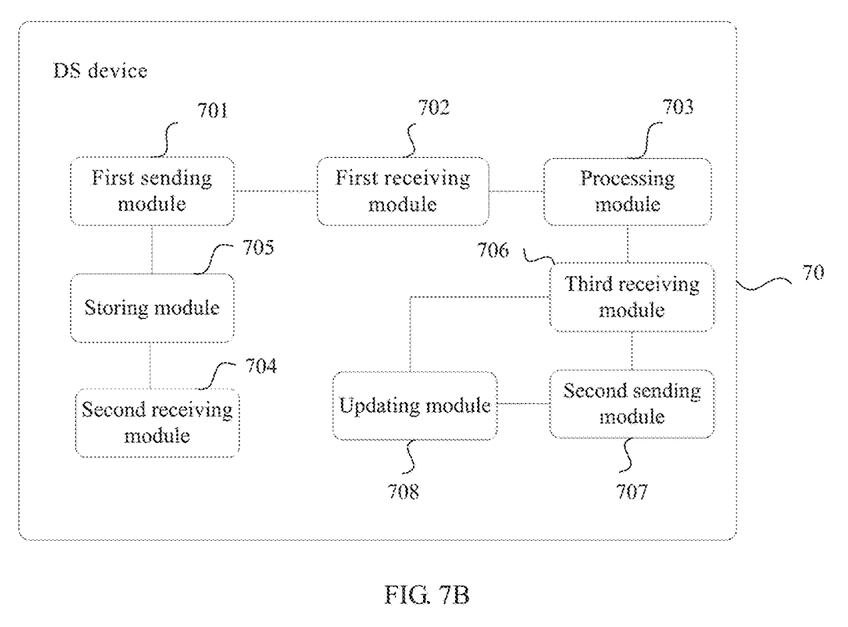
FIG. 7B is a schematic structural diagram of another DS device according to the present invention.

FIG. 7B is a schematic structural diagram of another DS device according to the present invention. Further, on the basis of the foregoing embodiment, the DS device 70 further includes a second receiving module 704 configured to receive an extended LLDP message sent by another DS device, where the extended LLDP message includes device attribute information of the another DS device; and a storing module 705 configured to store the device attribute information of the another DS device in the extended LLDP message in a MIB.

Further, on the basis of the foregoing embodiment, the DS device 70 further includes a third receiving module 706 configured to after the processing module joins the first DS domain according to the notification message, if update occurs in the first DS domain, receive an update message sent by the NMS; or configured to receive an update message sent by a DS device that belongs to the first DS domain; a second sending module 707 configured to when the third receiving module 706 receives the update message sent by the NMS, send the update message to another DS device that belongs to the first DS domain, so that the another DS device that belongs to the first DS domain performs DS domain update according to the update message; and an updating module 708 configured to perform DS domain update according to the update message.

The device in the foregoing embodiment is used to implement the technical solutions of the method embodiment on a DS device side, and the implementation principles and technical effects of the device are similar to those of the method, and are not described herein again.

Figure 8:
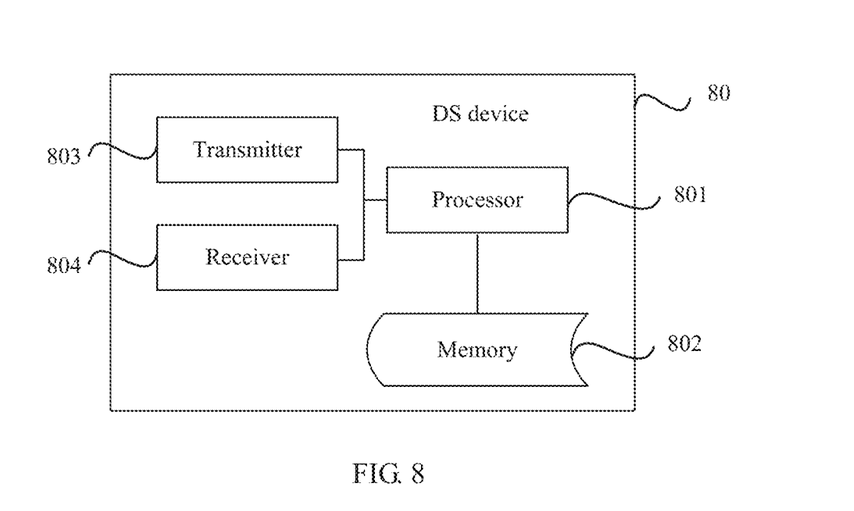
FIG. 8 is a schematic structural diagram of a DS device according to the present invention.

FIG. 8 is a schematic structural diagram of a DS device according to the present invention. As shown in FIG. 8, a DS device 80 according to this embodiment includes a processor 801 and a memory 802, and the DS device 80 may further include a transmitter 803 and a receiver 804. The transmitter 803 and the receiver 804 may be connected to the processor 801. The transmitter 803 is configured to send data or a message; the receiver 804 is configured to receive the data or the message; the memory 802 stores a program instruction; when the DS device 80 runs, the processor 801 and the memory 802 communicate with each other, and the processor 801 invokes the program instruction in the memory 802 to perform the following operations: sending device attribute information to an NMS, so that the NMS determines, according to device attribute information of multiple DS devices, a DS device that belongs to a first DS domain; receiving a notification message sent by the NMS; and joining the first DS domain according to the notification message.

Optionally, the device attribute information includes at least one of the following types of information: a DS domain identifier, a device identifier, a DS rule applied to a device, a device type, and a device software version.

Optionally, before the sending device attribute information to an NMS, the following is further included: receiving an extended LLDP message sent by another DS device, where the extended LLDP message includes device attribute information of the other DS device; and storing the device attribute information of the another DS device in the extended LLDP message in a MIB.

Optionally, after the DS domain is generated according to the notification message, the following is further included: receiving an update message sent by the NMS, and performing DS domain update according to the update message; or receiving an update message sent by a DS device that belongs to the first DS domain, and performing DS domain update according to the update message; or receiving an update message sent by the NMS, performing DS domain update according to the update message, and sending the update message to another DS device that belongs to the first DS domain, so that the another DS device that belongs to the first DS domain performs DS domain update according to the update message.

The update message includes at least one of the following types of information:

DS rule information and a QoS policy.

The DS device in this embodiment may be used to implement the technical solutions provided in the method embodiment on a DS device side in the present invention, and the implementation principles and technical effects of the device are similar to those of the method, and are not described herein again.

Figure 9:
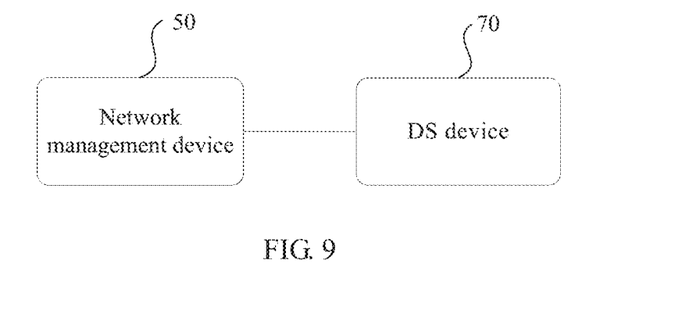
FIG. 9 is a schematic structural diagram of a DS domain system according to the present invention.

FIG. 9 is a schematic structural diagram of a DS domain system according to the present invention. As shown in FIG. 9, the system according to this embodiment includes a network management device 50 and a DS device 70. The network management device 50 may use a structure of the network management device according to the embodiments of FIG. 5 and FIG. 6 of the present invention. Correspondingly, the network management device may implement the technical solutions provided in the method embodiments of FIG. 1 and FIG. 3; and the DS device 70 may use a structure of the DS device according to the embodiments of FIG. 7A, FIG. 7B, and FIG. 8 of the present invention. Correspondingly, the network management device may implement the technical solutions of the method embodiment of FIG. 4, and the implementation principles and technical effects of the device are similar to those of the method, and are not described herein again.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A differentiated service (DS) domain generating method comprising:
    obtaining device attribute information of multiple DS devices;
    determining, according to the device attribute information of the multiple DS devices, a DS device that belongs to a first DS domain, wherein a DS domain comprises DS devices supporting a same Quality of Service (QoS) policy; and
    sending a notification message comprising a DS rule to the DS device that belongs to the first DS domain, wherein the notification message is used to enable the DS device that belongs to the first DS domain to join the first DS domain and to apply the DS rule.

2. The method according to claim 1, wherein the device attribute information comprises a DS domain identifier and at least one of the following types of information: a device identifier, a DS rule applied to a device, a device type, and a device software version, and wherein determining, according to the device attribute information of the multiple DS devices, the DS device that belongs to the first DS domain comprises determining that DS devices with a same DS domain identifier in the multiple DS devices are DS devices that belong to the first DS domain.

3. The method according to claim 1, wherein the device attribute information comprises a device identifier, and at least one of the following types of information: a DS domain identifier, a DS rule applied to a device, a device type, and a device software version, and wherein determining, according to the device attribute information of the multiple DS devices, the DS device that belongs to the first DS domain comprises:
    determining whether a first DS device in the multiple DS devices has a device identifier of another DS device that is in a same DS domain as the first DS device;
    determining that the first DS device and the other DS device are DS devices that belong to the first DS domain when the first DS device has the device identifier of the other DS device that is in the same DS domain as the first DS device; and
    determining, when the first DS device does not have the device identifier of the other DS device that is in the same DS domain as the first DS device, that a DS device in the multiple DS devices is a DS device that belongs to the first DS domain, when the DS device satisfies at least one of the following conditions:
        a DS rule applied to the device is the same as that of the first DS device;
        a device type is the same as that of the first DS device; and
        a device software version is the same as that of the first DS device.

4. The method according to claim 1, wherein after sending the notification message to the DS device that belongs to the first DS domain, the method further comprises: sending an update message to the DS device that belongs to the first DS domain when the first DS domain needs to be updated, wherein the update message is used to enable the DS device that belongs to the first DS domain to perform DS domain update according to the update message.

5. The method according to claim 1, wherein after sending the notification message to the DS device that belongs to the first DS domain, the method further comprises: sending an update message to a second DS device that belongs to the first DS domain when the first DS domain needs to be updated, wherein the update message is used to enable the second DS device to send the update message to another DS device that belongs to the first DS domain.

6. A differentiated service (DS) domain generating method comprising:
    sending, DS device, device attribute information to a network management system (NMS);
    receiving, by the DS device, a notification message comprising a DS rule sent by the NMS, wherein the notification message is used to enable the DS device to join a DS domain;
    wherein the DS domain comprises DS devices supporting a same Quality of Service (QoS) policy; and
    joining, by the DS device, the first DS domain and applying the DS rule according to the notification message.

7. The method according to claim 6 further comprising:
    receiving an extended Link Layer Discovery Protocol (LLDP) message sent by another DS device, wherein the extended LLDP message comprises device attribute information of the another DS device; and
    storing the device attribute information of the another DS device in the extended LLDP message in a management information base (MIB).

8. The method according to claim 6, wherein after joining the first DS domain according to the notification message, when the first DS domain needs to be updated, the method further comprises:
    receiving an update message from the NMS, and
    performing a DS domain update according to the update message.

9. A network management device comprising:
    a memory comprising instructions; and
    a processor coupled to the memory and configured to execute the instructions to:
        obtain device attribute information of multiple differentiated service (DS) devices;
        determine, according to the device attribute information of the multiple DS devices, a DS device that belongs to a first DS domain, wherein a DS domain comprises DS devices supporting a same Quality of Service (OoS) policy; and
        send a notification message comprising a DS rule to the DS device that belongs to the first DS domain, wherein the notification message is used to enable the DS device that belongs to the first DS domain to join the first DS domain and to apply the DS rule.

10. The device according to claim 9, wherein the device attribute information comprises a DS domain identifier and at least one of the following types of information: a device identifier, a DS rule applied to a device, a device type, and a device software version, and wherein the determining module is configured to determine that DS devices with a same DS domain identifier in the multiple DS devices are DS devices that belong to the first DS domain.

11. The device according to claim 9, wherein the device attribute information comprises a device identifier, and at least one of the following types of information: a DS domain identifier, a DS rule applied to a device, a device type, and a device software version, and wherein the processor is further configured to execute the instructions to:
determine whether a first DS device in the multiple DS devices has a device identifier of another DS device that is in a same DS domain as the first DS device;
determine that the first DS device and the other DS device are DS devices that belong to the first DS domain when the first DS device has the device identifier of the other DS device that is in the same DS domain as the first DS device; and
determine, when the first DS device does not have the device identifier of the other DS device that is in the same DS domain as the first DS device, that a DS device in the multiple DS devices is a DS device that belongs to the first DS domain, when the DS device satisfies at least one of the following conditions:
a DS rule applied to the device is the same as that of the first DS device;
a device type is the same as that of the first DS device; and
a device software version is the same as that of the first DS device.

12. The device according to claim 9, wherein the processor is further configured to execute the instructions to send an update message to the DS device that belongs to the first DS domain, after the first sending module sends the notification message to the DS device that belongs to the first DS domain, and when the first DS domain needs to be updated, wherein the update message is used to enable the DS device that belongs to the first DS domain to perform DS domain update according to the update message.

13. The device according to claim 9, wherein the processor is further configured to execute the instructions to: send an update message to a second DS device that belongs to the first DS domain, after the first sending module sends the notification message to the DS device that belongs to the first DS domain, and when the first DS domain needs to be updated, wherein the update message is used to enable the second DS device to send the update message to another DS device that belongs to the first DS domain.

14. A differentiated service (DS) device comprising:
a memory comprising instructions; and
a processor coupled to the memory and configured to execute the instructions to:
seed device attribute information to a network management system (NMS);
receive a notification message comprising a DS rule sent by the NMS, wherein the notification message is used to enable the DS device to join a DS domain, wherein the DS domain comprises DS devices supporting a same Quality of Service (QoS) policy; and
to join the first DS domain and applying the DS rule according to the notification message.

15. The device according to claim 14, wherein the processor is further configured to execute the instructions to:
receive an extended Link Layer Discovery Protocol (LLDP) message sent by another DS device, wherein the extended LLDP message comprises device attribute information of the another DS device; and
store the device attribute information of the another DS device in the extended LLDP message in a management information base (MIB).

16. The device according to claim 14, wherein the processor is further configured to execute the instructions to:
receive an update message from the NMS when the first DS domain needs to be updated; and
perform DS domain update according to the update message.

17. The device according to claim 16, wherein the processor is further configured to execute the instructions to send the update message to another DS device that belongs to the first DS domain when the update message is received from the NMS, wherein the update message is used to enable the another DS device that belongs to the first DS domain to perform a DS domain update according to the update message.

18. The method according to claim 6, wherein after joining the first DS domain according to the notification message, when the first DS domain needs to be updated, the method further comprises:
receiving an update message from a DS device that belongs to the first DS domain, and
performing a DS domain update according to the update message.

19. The method according to claim 6, wherein after joining the first DS domain according to the notification message, when the first DS domain needs to be updated, the method further comprises:
receiving an update message from the NMS, performing LDS domain update according to the update message, and
sending the update message to another DS device that belongs to the first DS domain, the update message is used to enable the Mother DS device that belongs to the first DS domain to perform DS domain update according to the update message.

20. The device according to claim 14 further comprising:
a third receiving module configured to receive an update message from another DS device that belongs to the first DS domain when the first DS domain needs to be updated; and
an updating module configured to perform DS domain update according to the update message.

* * * * *

UNITED STATES PATENT AND TRADEMARK OFFICE
CERTIFICATE OF CORRECTION

Page 1 of 1

PATENT NO. : 9,667,554 B2
APPLICATION NO. : 14/569138
DATED : May 30, 2017
INVENTOR(S) : Xianming Li, Ying Xie and Shuming Liu It is certified that error appears in the above-identified patent and that said Letters Patent is hereby corrected as shown below:

Column 14, Line 28, Claim 6 should read:
sending by a DS device, device attribute information to a Column 15, Lines 59-60, Claim 14 should read:
send device attribute information to a network management system (NMS);

Column 16, Line 6, Claim 14 should read:
join the first DS domain and applying the DS rule Column 16, Lines 22-23, Claim 16 should read:
perform a DS domain update according to the update message Column 16, Line 46, Claim 19 should read:
a DS domain update according to the update message, Column 16, Line 50, Claim 19 should read:
used to enable the another DS device that belongs to the Signed and Sealed this
Twelfth Day of September, 2017

Joseph Matal
*Performing the Functions and Duties of the*
*Under Secretary of Commerce for Intellectual Property and*
*Director of the United States Patent and Trademark Office*